United States Patent
Cracchiolo et al.

(10) Patent No.: US 10,055,743 B1
(45) Date of Patent: Aug. 21, 2018

(54) SYSTEM AND METHOD OF MANAGING CUSTOMER CARE

(71) Applicant: Sprint Communications Company L.P., Overland Park, KS (US)

(72) Inventors: Meredith M. Cracchiolo, Huntington Beach, CA (US); John R. Glenn, Overland Park, KS (US); Anna M. Jenkins, Raymore, MO (US); Timothy S. Kellerman, Leawood, KS (US); Carrie L. Stevick, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1010 days.

(21) Appl. No.: 14/322,919

(22) Filed: Jul. 3, 2014

(51) Int. Cl.
*G06Q 30/00* (2012.01)

(52) U.S. Cl.
CPC .................. *G06Q 30/016* (2013.01)

(58) Field of Classification Search
CPC .................................................. G06Q 30/016
See application file for complete search history.

(56) References Cited

U.S. PATENT DOCUMENTS

| | | | |
|---|---|---|---|
| 6,886,037 B1* | 4/2005 | Brewer | G06Q 30/02 709/217 |
| 8,958,542 B1 | 2/2015 | Kaufman | |
| 2002/0072921 A1 | 6/2002 | Boland et al. | |
| 2003/0212558 A1 | 11/2003 | Matula | |
| 2006/0123005 A1 | 6/2006 | Burnett et al. | |
| 2008/0232575 A1 | 9/2008 | Gumbula | |
| 2010/0285773 A1 | 11/2010 | Matsuda | |
| 2012/0316928 A1* | 12/2012 | Shankaran Nair | G06Q 10/06 705/7.38 |
| 2013/0124262 A1* | 5/2013 | Anchala | G06Q 30/02 705/7.32 |
| 2013/0136247 A1 | 5/2013 | Stine et al. | |
| 2013/0136253 A1 | 5/2013 | Liberman Ben-Ami et al. | |
| 2013/0185176 A1* | 7/2013 | Anchala | G06Q 30/02 705/27.1 |
| 2014/0207614 A1 | 7/2014 | Ramaswamy et al. | |
| 2015/0051957 A1* | 2/2015 | Griebeler | G06Q 10/06395 705/7.41 |
| 2015/0339677 A1* | 11/2015 | Chan | G06Q 30/02 705/7.29 |

OTHER PUBLICATIONS

Office Action dated May 8, 2017, U.S. Appl. No. 14/326,244, filed Jul. 8, 2014.
Glenn, John R., et al., "Interaction History Database," filed Jul. 8, 2014, U.S. Appl. No. 14/326,244.
Final Office Action dated Sep. 21, 2017, U.S. Appl. No. 14/326,244, filed Jul. 8, 2014.
Advisory Action dated Nov. 30, 2017, U.S. Appl. No. 14/326,244, filed Jul. 8, 2014.

* cited by examiner

*Primary Examiner* — Dennis Ruhl

(57) ABSTRACT

Embodiments of the disclosure relate generally to methods and systems for monitoring customer service channels and identifying possible improvements for customer service channels. A computer system may comprise one or more analysis applications operable to receive and analyze information from a plurality of customer service channels. Customer service channels may include retail stores, customer care centers, and websites.

15 Claims, 5 Drawing Sheets

SYSTEM AND METHOD OF MANAGING CUSTOMER CARE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Customer service channels may be operated to provide service and support to customers of a mobile communication service provider. A customer may contact a customer service channel with an issue or question, which may then be handled by the customer service channel or directed to another customer service channel. Customer service channels may include retail or store locations, a customer care call center, and/or a website.

SUMMARY

In an embodiment, a method for identifying customer service transformation opportunities is disclosed. The method comprises: monitoring, by a computer system, the reasons for customer initiated contacts with a mobile communication service provider for a plurality of customer service channels, wherein the computer system is operable to collect and transform data from distinct databases associated with each of the plurality of customer service channels; monitoring, by the computer system, a containment of each customer initiated contact within an original customer service channel; monitoring, by the computer system, a movement of customer initiated contacts between customer service channels based on tracking contacts for a particular customer within a predefined time period; monitoring, by the computer system, customer satisfaction reports for each customer service channel for each of the customer initiated contacts; generating, by an application executed by the computer system, a report that comprises each of the above monitored data, wherein the report is categorized based on the reasons for the transactions; and based on the report, automatically taking action to enhance the customer service process, wherein the steps of monitoring and generating a report are completed by a computer system in communication with the plurality of customer service channels.

In an embodiment, a method for identifying improvements for customer service channels is disclosed. The method comprises: monitoring the reasons for customer initiated contacts with a mobile communication service provider for a plurality of customer service channels, wherein the customer service channels comprise a retail store customer service channel, a customer care center customer service channel, and a website customer service channel; monitoring the containment of each customer initiated contact within the original customer service channel; monitoring the movement of customer initiated contacts between customer service channels based on tracking contacts for a particular customer within a predefined time period; monitoring customer satisfaction reports for each customer service channel for each of the customer initiated contacts; generating a report that comprises each of the above monitored data, wherein the report is categorized based on the reasons for these transactions; identifying a particular reason wherein, when the customer initiated contacts for that reason are moved between customer service channels, the customer satisfaction reports improve at the channel where the contacts are resolved; identifying a best customer service channel for the particular reason, wherein the best customer service channel is the channel with the improved customer satisfaction reports; and directing future transactions to the best customer service channel for that particular reason.

In an embodiment, a computer system is disclosed. The computer system comprises: a memory; a processor; and an application stored in the memory that, when executed by the processor, monitors the reasons for customer initiated contacts with a mobile communication service provider for a plurality of different customer service channels; monitors a containment of each customer initiated contact within an original customer service channel; monitors a movement of customer initiated contacts between customer service channels based on tracking contacts for a particular customer within a predefined time period; monitors customer satisfaction reports for each customer service channel for each of the customer initiated contacts; and generates a report that comprises each of the above monitored data, wherein the report is categorized based on the reasons for the transactions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
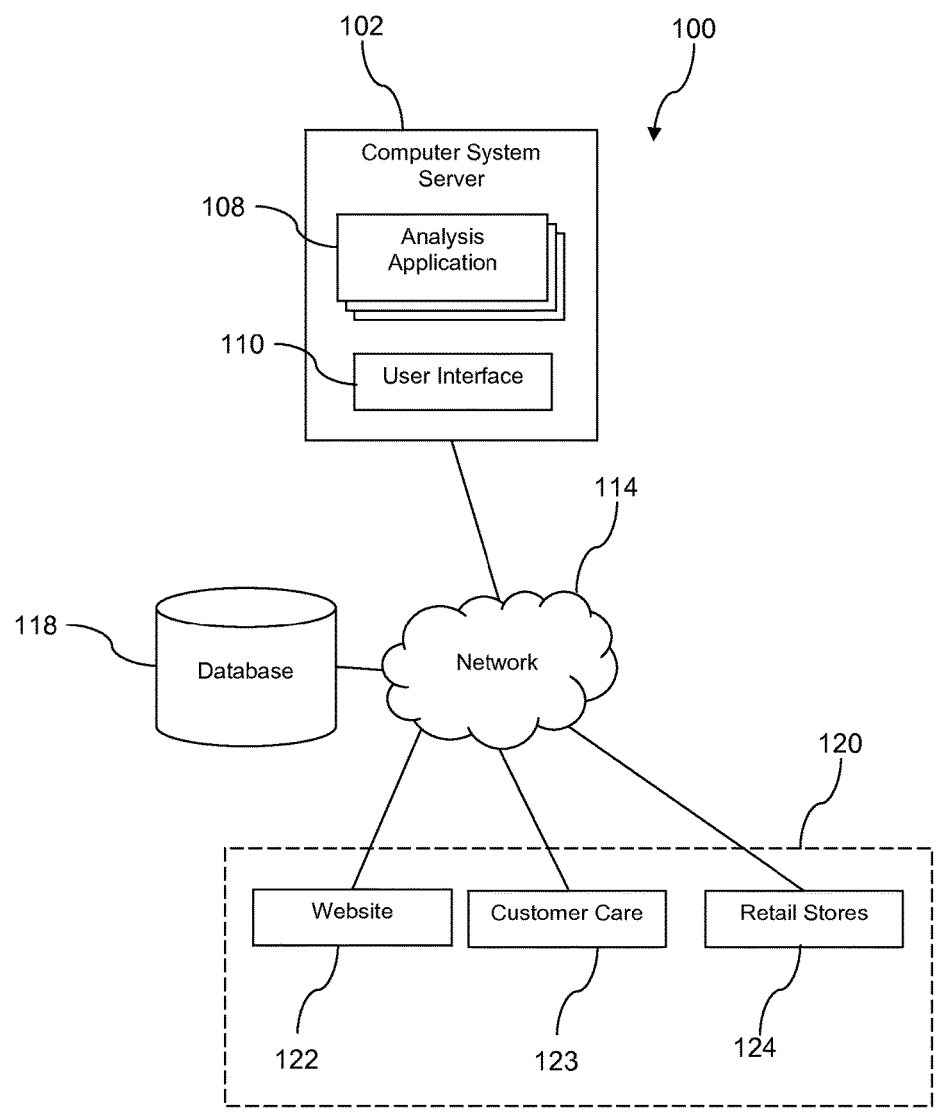
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure relate generally to methods and systems for monitoring customer service channels and identifying possible improvements for customer service channels. Customer service channels may be operable to handle service, issues, questions, and problems for customers of a communication service provider, for example, mobile device users. A computer system may execute one or more analysis applications operable to receive and analyze information from a plurality of customer service channels. Customer service channels may include retail stores, customer care centers, and websites. A customer may visit a retail store to handle issues and/or questions concerning their device and/or service. A customer may also call a customer care center to handle an issue or question over the phone. Additionally, a customer may access a customer service website to find answers to a question or issue with their service and/or device.

Customers may initiate contacts with a customer service channel, and the reason for the contact may be monitored by the analysis application. Additionally, the results of the contact, the containment of the contact, any movement of the customer between customer service channels, and customer satisfaction survey results may be monitored. Movement may be defined as a customer contacting a first customer service channel, and then, within a pre-defined time period, contacting a second customer service channel. Inherent in the idea of movement defined here is the assumption that if the customer contacts customer service again within a relatively short period of time, within the pre-defined time period, the customer is continuing to seek assistance to resolve the same issue with his or her mobile device or service account. It is understood that in some cases this assumption is not correct: in some cases a customer may call back within the pre-defined period of time but about a second, unrelated issue or question. The analysis application may generate reports based on the information received from the customer service channels. In some cases, the analysis application may receive information from a database written to the database from the customer service channels, wherein information may be stored in the database and then communicated to the analysis application(s)

In some cases, analysis of the reports generated by the analysis application(s) may result in identifying areas for possible improvement in the interaction between customers and the customer service channels. For example, customer satisfaction reports may be monitored and compared to other information about the customers' contact with the customer service channel(s). As an example, a customer may contact the customer care center. The reason for the contact may be noted and associated with the contact. Then, the customer may initiate a contact with a retail store within a certain number of days of the first contact. This may mean that the customer's need for service was not contained in the initial customer service channel, but rather moved to a second customer service channel.

Generally, it may be assumed that customers feel they are receiving incompetent service if they move their request for service between customer service channels. In some cases, however, the customer satisfaction reports may indicate that customers that move their requests for service from a first customer service channel to a second customer service channel have higher satisfaction, for a particular reason for contact. Identifying this special case may lead to adjustments in the theories and processes for handling customer contacts for that same contact reason. For example, if the customer satisfaction is higher when the contact is resolved in a retail store, even if the contact was moved from another customer service channel, it may be beneficial to direct future contacts with the same reason for contact directly to a retail store, as opposed to only striving to contain a contact within the initial customer service channel.

Other similar analysis and inferences may be made by observing the results shown in the reports generated by the analysis application. In some cases, the reports may be organized by the reason for contact.

Turning now to FIG. 1, a communication system 100 is described. The communication system 100 may comprise a computer system 102 comprising one or more analysis applications 108. The computer system 102 may communicate with a network 114 via a wired or wireless connection. The network 114 may be a private network, a public network, or a combination thereof. The network 114 may promote voice communications and data communications. Portions of the network 114 may provide an IP Multimedia Subsystem (IMS) network.

In some embodiments, the computer system 102 may communicate with one or more database(s) 118 to obtain or share information. For example, the computer system 102 may communicate with one or more customer service information database(s) 118, wherein one or more of the analysis applications 108 may receive information concerning customer service interactions from the database(s) 118. In some embodiments, the customer service information may comprise information concerning customer initiated contacts with one or more customer service channels 120 provided by a mobile communication service provider. In some embodiments, the customer service information may also comprise customer satisfaction reports. The multiple customer service channels 120 may comprise retail stores 124, customer care centers 123, and websites 122. In some embodiments, each of the customer service channels 120 may comprise a distinct database 118, wherein the computer system 102 may be operable to receive and transform information from each of the distinct databases 118.

A customer may contact one of the customer service channels 120 for any number of reasons, including problems or issues with their mobile communication service or device. For example, the reason for a customer initiated contact may be a problem with their mobile communication device that requires a repair or a replacement of the device. The reasons for each customer initiated contact may be monitored, recorded, and stored in the database(s) 118 by each of the customer service channels 120. Additionally, other information about contacts with a customer service channel 120 may be recorded and stored in the database(s) 118, such as customer satisfaction, movement of the customer between customer service channels, results of the customer initiated contact, and/or deactivation rates from the customer imitated contacts, and the like.

In some embodiments, the analysis application 108 may be operable to analyze the information stored in and/or obtained from the database(s) 118. Additionally, information may be received by the computer system 102 from the plurality of customer service channels 120. The information may comprise reasons for the customer initiated contact, the channel where the contact was initiated, containment of the contact, movement of the contact within a determined time period (such as a number of days), customer satisfaction results related to the contact, results of the customer initiated contact, etc. The analysis application 108 may be operable to generate reports of the information received from each of the customer service channels 120 and/or database 118, wherein the reports may comprise information gathered from multiple customer service channels 120.

In some embodiments, the computer system 102 may comprise a user interface 110. The user interface 110 may be operable to present the reports generated by the analysis application(s) 108 to a user, wherein the user may be able to analyze the reports generated by the analysis application 108. Additionally, the user may be able to manipulate the reports, using the user interface 110 and/or the analysis application 108, to be organized in different ways, show different time frames, or other possible information that could be provided by the analysis application 108. In some embodiments, the reports may be organized by the top reasons for contacts, based on the number of contacts associated with that reason. For example, the top 20 reasons for contact may be organized and present by the report(s). The reports may show the containment percentage for the contacts associated with each of the contact reasons, the movement percentages between each of the customer service channels, and other information described above. It should be understood that any information related to customer service interactions may be included in the reports generated by the analysis application 108.

In some embodiments, the reports may be used to identify areas where the customer service experience may be improved. For example, customer satisfaction results may be monitored for each of the specific reasons for contact. In some embodiments, a "top box" monitoring system may be used, wherein the customer satisfaction results are displayed for a particular contact reason as the percentage of customers who gave the highest rank or "top box" for the customer care experience they had when calling in for that particular contact reason. A "top box" metric may derive from this, such that the "top box" metric for each identified reason and/or cause for contacting customer service channels is associated with the percentage of customers who give the highest possible customer satisfaction ranking for the care or assistance they received. Additionally, customer satisfaction reports may be monitored when customer contacts are contained within the initial customer service channel, and when the contacts move between channels. In other words, the customer satisfaction report for the contacts for a specific reason may be associated with the containment of the contacts for that reason.

As an example, a report may show that customer satisfaction results improve for a specific reason for contact whenever the customers are directed to a specific customer service channel, even if the contact moves from one channel to another. For example, when the reason for contact concerns maintenance on a mobile communication device, customer satisfaction may be higher when the problem is resolved at a retail store, even if the contact was moved from another customer service channel, and therefore not contained. This may contradict the theory that customers may be more satisfied if all contacts are contained within the original customer service channel, and therefore may lead to adjustments in the customer service practice. For example, customers that call a customer care center about a maintenance issue for their device may be directed to a retail store to solve the issue rather than trying to solve the issue over the phone because the retail technician can visibly see what the customer is experiencing on his or her phone. Also, customers that call a customer care center regarding an advanced device, such as a smart phone, may be more satisfied handling the issue in a retail store, due to the difficulty of communicating over the phone about an advanced device without a common vocabulary concerning the device.

In some embodiments, containment and movement of the contact may be monitored by noting if the same customer account and/or subscriber initiates another contact within a pre-defined time period, such as a number of days. For example, a customer may first call the customer care center to initiate a contact with customer service. Then, sometime within the pre-defined number of days, the same customer may go to a retail store, and therefore initiate a second contact with customer service. In this case, the contact may be considered moved from the first customer service channel (the care center) to the second customer service channel (the retail store), and therefore not contained. It may be assumed that if the customer contacts a customer service channel a second time within the pre-determined time period, the second contact relates to the same issue as the first contact. In fact, the second contact may relate to a different issue, but the system may assume that it is the same issue. In some cases, the two contacts may concern the same problem, wherein the problem was not handled by the first customer service channel, and was therefore transferred (either by customer service or by the customer) to a second service channel. In other cases, the contacts may concern different issues. However, if multiple contacts happen within the set number of days, the contact may be consider moved and not contained.

In some embodiments, the deactivation rate for contacts that are not contained (and/or contacts that are contained) may be monitored and associated with the contact reason. In some embodiments, the deactivation rate may be monitored after a set number of days following the resolution of the contact, such as 7 days, 30 days, and/or 45 days. In other words, the number (or percentage) of customers that cancel their account or subscription with the service provider may be monitored at certain intervals after the contact with the customer service channel(s). In some embodiments, deactivation rates may also be referred to as "cancels" and/or "churn," wherein these terms may be used interchangeably.

Figure 2:
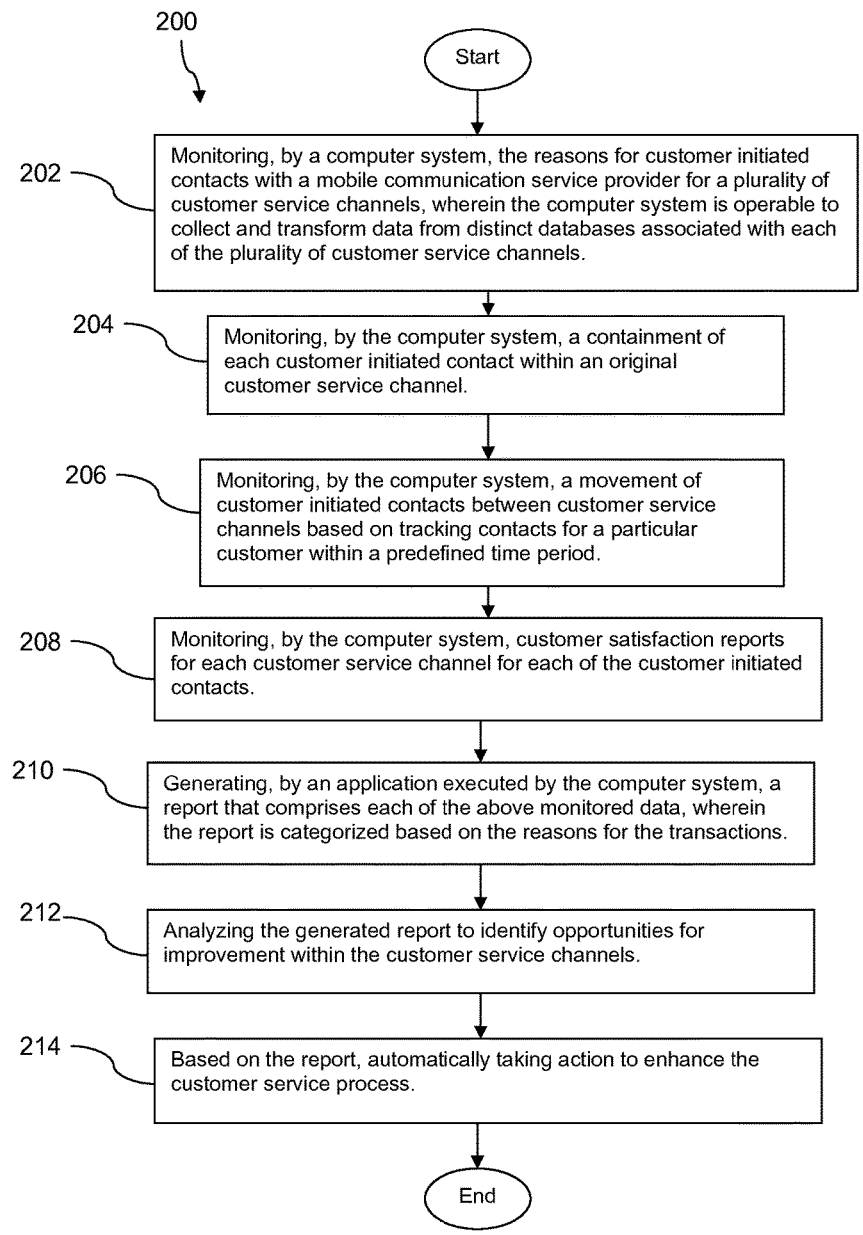
FIG. 2 is a flow chart illustrating a method according to an embodiment of the disclosure.

Turning now to FIG. 2, a method 200 for identifying customer service transformation opportunities is described. At block 202, the reasons for customer initiated contacts with a mobile communication service provider may be monitored by a computer system for a plurality of customer service channels, wherein the computer system is operable to collect and transform data from distinct databases associated with each of the plurality of customer service channels. At block 204, a containment of each customer initiated contact within an original customer service channel may be monitored by the computer system. At block 206, a movement of customer initiated contacts between customer service channels may be monitored by the computer system based on tracking contacts for a particular customer within a predefined time period. At block 208, customer satisfaction reports for each customer service channel may be monitored by the computer system for each of the customer initiated contacts. At block 210, a report may be generated by an application executed by the computer system that comprises each of the above monitored data, wherein the report is categorized based on the reasons for the transactions. In some embodiments, at block 212, the generated report may be analyzed to identify opportunities for improvement within the customer service channels. At block 214, based on the generated report, action may be taken automatically to enhance the customer service process. In some embodiments, the steps of monitoring and generating a report may be completed by a computer system in communication with the plurality of customer service channels.

In some embodiments, if customer satisfaction reports improve when a customer moves between customer service channels, the best customer service channel may be identified for handling a particular reason based on the customer satisfaction reports. In some embodiments, future transactions may be directed to the best customer service channel for that particular reason. In some embodiments, the method 200 may comprise identifying what tool is being used by the best customer service channel to handle the particular reason, and implementing a similar tool in other customer service channels. In some embodiments, movement may comprise multiple moves of customer initiated contacts of a single customer between customer service channels, and the final channel where the transaction is resolved is deemed the best customer service channel for the particular reason. In some embodiments, the plurality of customer service channels may comprise a retail store customer service channel, a customer care center customer service channel, and a website customer service channel. In some embodiments, the method 200 may further comprise monitoring deactivation rate for the each customer contact reason.

Figure 3A:
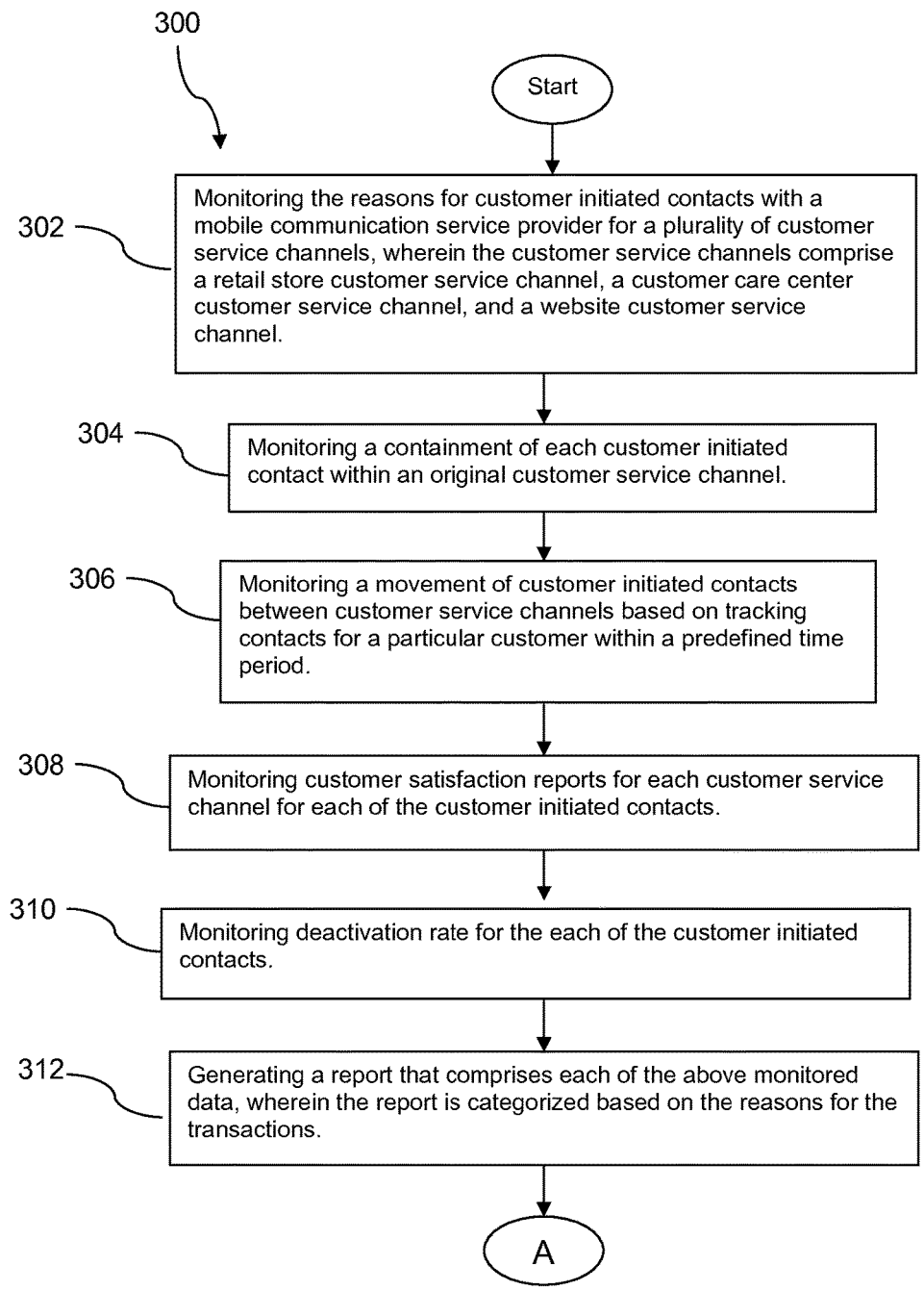
FIGS. 3A and 3B are a flow chart illustrating another method according to an embodiment of the disclosure.
Figure 3B:
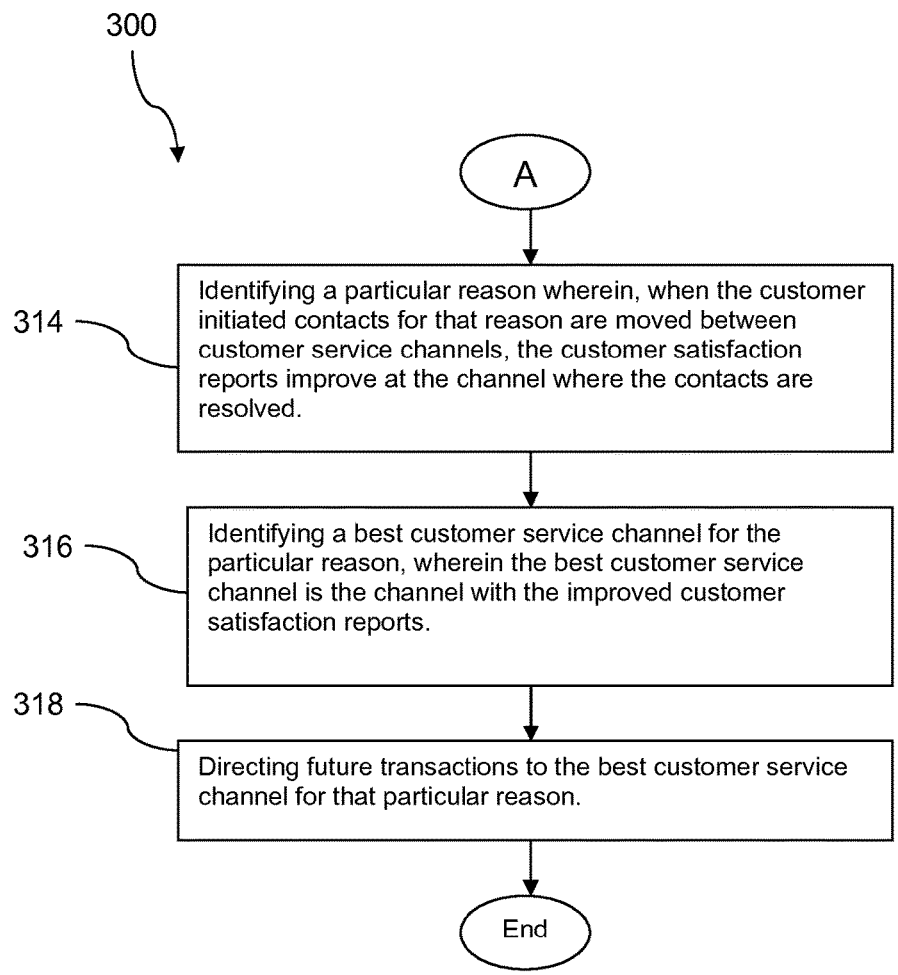

Turning now to FIGS. 3A-3B, a method 300 for identifying improvements for customer service channels is described. At block 302, the reasons for customer initiated contacts with a mobile communication service provider may be monitored for a plurality of customer service channels, wherein the customer service channels comprise a retail store customer service channel, a customer care center customer service channel, and a website customer service channel. At block 304, a containment of each customer initiated contact within an original customer service channel may be monitored. At block 306, a movement of customer initiated contacts between customer service channels may be monitored based on tracking contacts for a particular customer within a predefined time period. At block 308, customer satisfaction reports may be monitored for each customer service channel for each of the customer initiated contacts. In some embodiments, at block 310, a deactivation rate for the each customer contact reason may be monitored. At block 312, a report may be generated that comprises each of the above monitored data, wherein the report is categorized based on the reasons for the transactions. At block 314, a particular reason may be identified, wherein, when the customer initiated contacts for that reason are moved between customer service channels, the customer satisfaction reports improve at the channel where the contacts are resolved. At block 316, a best customer service channel may be identified for the particular reason, wherein the best customer service channel is the channel with the improved customer satisfaction reports. At block 318, future transactions may be directed to the best customer service channel for that particular reason.

In some embodiments, monitoring the movement of customers between customer service channels may be accomplished by tracking transactions for a particular account within a specific time period. In some embodiments, the steps of the method may be completed by one or more analysis application executed by a computer system. In some embodiments, the method 300 may further comprise identifying a best customer service channel for a particular reason for contact based on the generate report and analysis.

Figure 4:
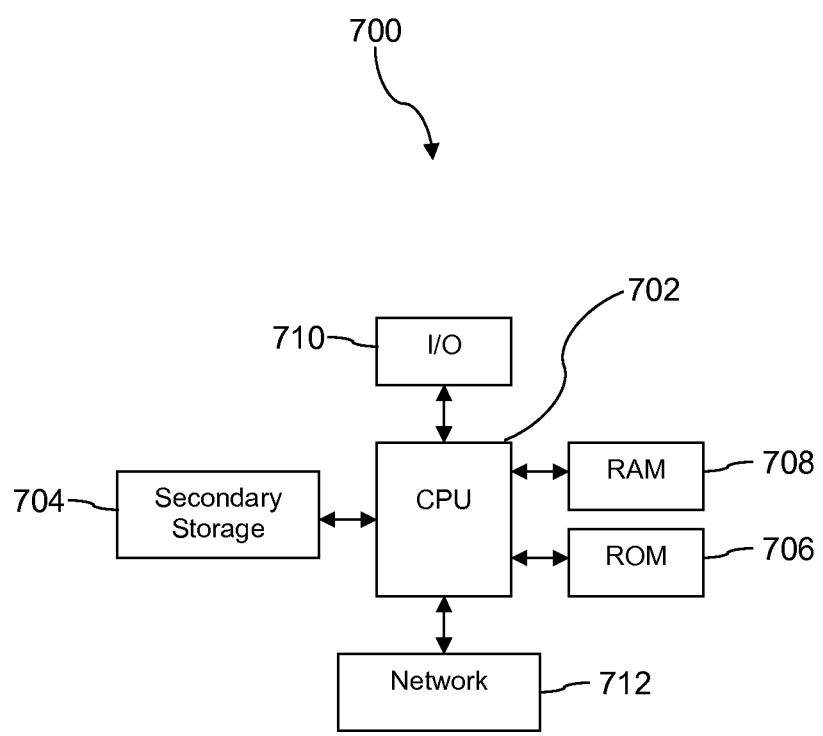
FIG. 4 is a block diagram of a computer system according to an embodiment of the disclosure.

FIG. 4 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for identifying customer service transformation opportunities, comprising:

automatically collecting and using, by a computer system comprising a non-transitory memory and a processor, a plurality of data from a plurality of different sources for a plurality of customer service channels to identify migration between the plurality of different channels, wherein the plurality of different sources comprise a plurality of databases;

monitoring, by the computer system based on the collected data from the plurality of different sources, customer initiated contacts contained within an original customer service channel of the plurality of customer service channels;

monitoring, by the computer system based on the collected data from the plurality of different sources, a movement of customer initiated contacts between two or more of the plurality of customer service channels based on tracking contacts for a customer within a predefined time period;

comparing, by the computer system, containment data including customer satisfaction reports for each customer service channel of the plurality of customer service channels for the customer initiated contacts contained within the original customer service channel with migration data including customer satisfaction reports for each customer service channel of the plurality of customer service channels for the customer initiated contacts that moved between two or more of the plurality of customer service channels;

for a reason associated with customer initiated contact, identifying, by the computer system, a change to routing requests based on the comparing, wherein the routing change comprises movement of a request from an initial customer service channel of the plurality of customer service channels to a different customer service channel of the plurality of customer service channels;

routing, by the computer system, requests associated with the reason according to the routing change from the initial customer service channel to the different customer service channel; and generating, by the computer system, a report that comprises customer satisfaction associated with the customer initiated contacts contained within the original customer service channel and customer satisfaction associated with the customer initiated contacts that moved between two or more of the plurality of customer service channels, wherein the report is categorized based on a plurality of reasons for the customer initiated contacts.

2. The method of claim 1, wherein the different customer service channel is a final channel where the requests are resolved.

3. The method of claim 1, wherein the plurality of customer service channels comprises: a retail store customer service channel, a customer care center customer service channel, and a website customer service channel.

4. The method of claim 1, further comprising monitoring a deactivation rate for each reason of the plurality of reasons.

5. A method for identifying improvements for customer service channels, comprising:

automatically collecting and using, by a computer system comprising a non-transitory memory and a processor, a plurality of data from a plurality of different sources for a plurality of customer service channels to identify migration between the plurality of different channels, wherein the plurality of different sources comprise a plurality of databases, and wherein the plurality of customer service channels comprise a retail store customer service channel, a customer care center customer service channel, and a website customer service channel;

monitoring, by the computer system based on the collected data from the plurality of different sources, customer initiated contacts contained within an original customer service channel of the plurality of customer service channels;

monitoring, by the computer system based on the collected data from the plurality of different sources, a movement of customer initiated contacts between two or more of the plurality of the plurality of customer service channels based on tracking contacts for a customer within a predefined time period;

comparing, by the computer system, containment data including customer satisfaction reports for each customer service channel of the plurality of customer service channels for each of the customer initiated contacts contained within the original customer service channel with migration data including customer satisfaction reports for each customer service channel of the plurality of customer service channels for the customer initiated contacts that moved between two or more of the plurality of customer service channels;

for a reason associated with customer initiated contact, identifying, by the computer system, a change to routing requests based on the comparing, wherein the routing change comprises movement of a request from an initial customer service channel of the plurality of customer service channels to a different customer service channel of the plurality of customer service channels;

routing, by the computer system, requests associated with the reason according to the routing change from the initial customer service channel to the different customer service channel; and generating, by the computer system, a report that comprises customer satisfaction associated with the customer initiated contacts contained within the original customer service channel and customer satisfaction associated with the customer initiated contacts that moved between two or more of the plurality of customer service channels, wherein the report is categorized based on a plurality of reasons for the customer initiated contacts.

6. The method of claim 5, wherein the computer system is in communication with each customer service channel of the plurality of customer service channels.

7. The method of claim 5, wherein the monitoring of the movement of customers between customer service channels comprises tracking, by the computer system, transactions for an account within a specific time period.

8. The method of claim 5, wherein the computer system executes one or more analysis applications that perform the steps of claim 5.

9. The method of claim 5, further comprising monitoring, by the computer system, a deactivation rate for each reason of the plurality of reasons.

10. A computer system comprising:
a non-transitory memory;
a processor; and
an application stored in the non-transitory memory that, when executed by the processor,
automatically collects and uses a plurality of data from a plurality of different sources for a plurality of customer service channels to identify migration between the plurality of different channels;

based on the collected data from the plurality of different sources, monitors customer initiated contacts contained within an original customer service channel of the plurality of customer service channels;

based on the collected data from the plurality of different sources, monitors a movement of customer initiated contacts between two or more of the plurality of customer service channels based on tracking contacts for a customer within a predefined time period;

compares containment data including customer satisfaction reports for each customer service channel of the plurality of customer service channels for each of the customer initiated contacts contained within the original customer service channel with migration data including customer satisfaction reports for each customer service channel of the plurality of customer service channels for the customer initiated contacts that moved between two or more of the plurality of customer service channels;

for a reason associated with customer initiated contact, identifies a change to routing requests based on the comparing, wherein the routing change comprises movement of a request from an initial customer service channel of the plurality of customer service channels to a different customer service channel of the plurality of customer service channels;

routes requests associated with the reason according to the routing change from the initial customer service channel to the different customer service channel; and generates a report that comprises customer satisfaction associated with the customer initiated contacts contained within the original customer service channel and customer satisfaction associated with the customer initiated contacts that moved between two or more of the plurality of customer service channels, wherein the report is categorized based on a plurality of reasons for the customer initiated contacts.

11. The system of claim 10, wherein the plurality of data is received from the plurality of customer service channels over a network.

12. The system of claim 10, wherein the plurality of data is received from one or more databases in communication with the computer system over a network.

13. The system of claim 10, wherein the plurality of customer service channels comprises: a retail store customer service channel, a customer care center customer service channel, and a website customer service channel.

14. The system of claim 10, further comprising a user interface operable to present the report generated by the application to a user.

15. The system of claim 14, wherein the user interface allows a user to input instructions for generating the report.

* * * * *